United States Patent
Yang et al.

(10) Patent No.: US 8,981,730 B2
(45) Date of Patent: Mar. 17, 2015

(54) SWITCHING DEVICE FOR ELECTRIC VEHICLE AND METHOD OF CONTROLLING THE SWITCHING DEVICE

(75) Inventors: Chun Suk Yang, Seoul (KR); Byung Woon Jang, Anyang-si (KR)

(73) Assignee: LSIS Co., Ltd., Anyang-Si, Gyeonggi-Do (KR)

(*) Notice: Subject to any disclaimer, the term of this patent is extended or adjusted under 35 U.S.C. 154(b) by 388 days.

(21) Appl. No.: 13/527,488

(22) Filed: Jun. 19, 2012

(65) Prior Publication Data

US 2012/0326674 A1 Dec. 27, 2012

(30) Foreign Application Priority Data

Jun. 23, 2011 (KR) .................. 10-2011-0061402

(51) Int. Cl.
*H02J 7/04* (2006.01)
*H02J 7/16* (2006.01)
*B60L 11/18* (2006.01)

(52) U.S. Cl.
CPC .......... *B60L 11/1812* (2013.01); *Y02T 10/7088* (2013.01); *Y02T 10/7005* (2013.01); *Y02T 90/14* (2013.01); *Y02T 90/127* (2013.01)
USPC ........... 320/139; 320/140; 320/141; 320/142; 320/143; 320/145; 320/137

(58) Field of Classification Search
USPC ......................... 320/139–143, 145
See application file for complete search history.

(56) References Cited

U.S. PATENT DOCUMENTS

| | | | |
|---|---|---|---|
| 5,182,508 A | * | 1/1993 | Schauder ...................... 318/801 |
| 5,635,804 A | * | 6/1997 | Tanaka et al. ................. 318/139 |
| 7,122,991 B2 | * | 10/2006 | Kitajima et al. .............. 318/800 |
| 2007/0103950 A1 | * | 5/2007 | Arisawa et al. ............... 363/132 |

FOREIGN PATENT DOCUMENTS

| | | |
|---|---|---|
| CN | 1134375 | 10/1996 |
| CN | 1249077 | 3/2000 |
| DE | 19842738 | 4/2000 |
| JP | 05-207664 | 8/1993 |
| JP | 11-98713 | 4/1999 |
| JP | 11-122826 | 4/1999 |
| JP | 2010-045961 | 2/2010 |
| JP | 2010-104227 | 5/2010 |
| JP | 2011-15495 | 1/2011 |
| KR | 1019950003575 | 4/1995 |

\* cited by examiner

*Primary Examiner* — Nghia Doan
(74) *Attorney, Agent, or Firm* — Lee, Hong, Degerman, Kang & Waimey

(57) ABSTRACT

Provided are a switching device for an electric vehicle and a method of controlling the switching device. The switching device includes a switch, a signal selection part, an inverter, and a controller. The switch generates a first or second switching signal according to an operation mode. The signal selection part receives the first or second switching signal, and selects the first or second switching signal according to the operation mode to output the selected switching signal. The inverter performs a direct current/alternating current conversion process on power according to the switching signal output from the signal selection part, and outputs the power. The controller determines the operation mode, and generates a control signal according to the operation mode such that the signal selection part selects the first or second switching signal.

11 Claims, 4 Drawing Sheets

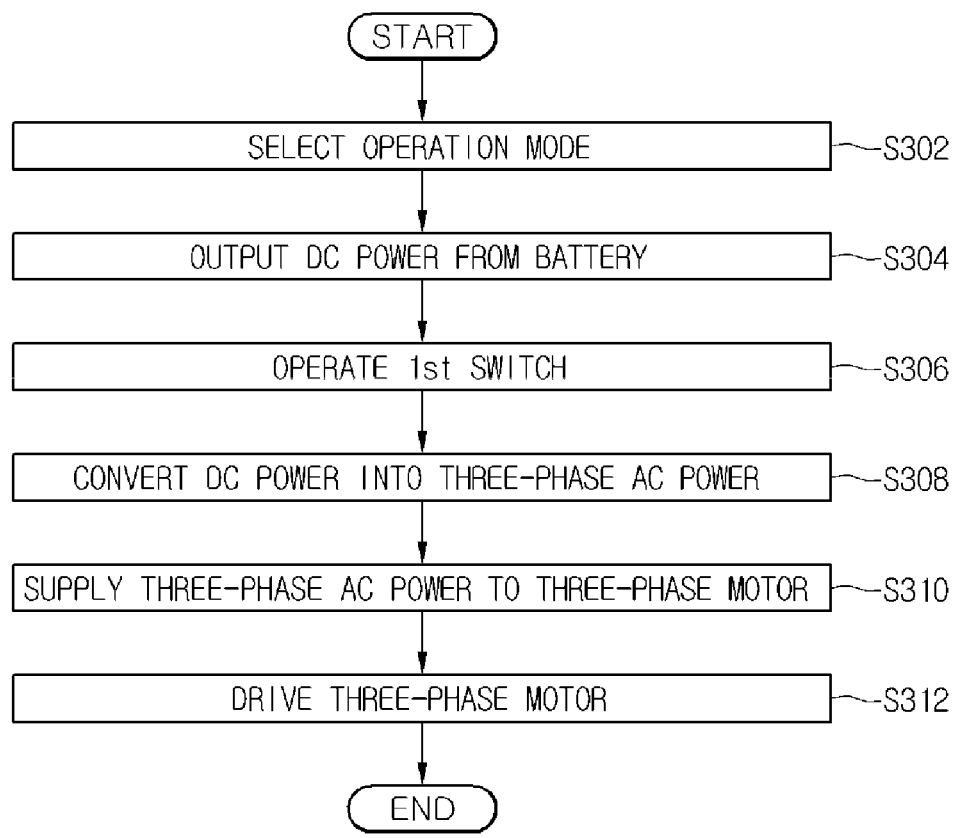

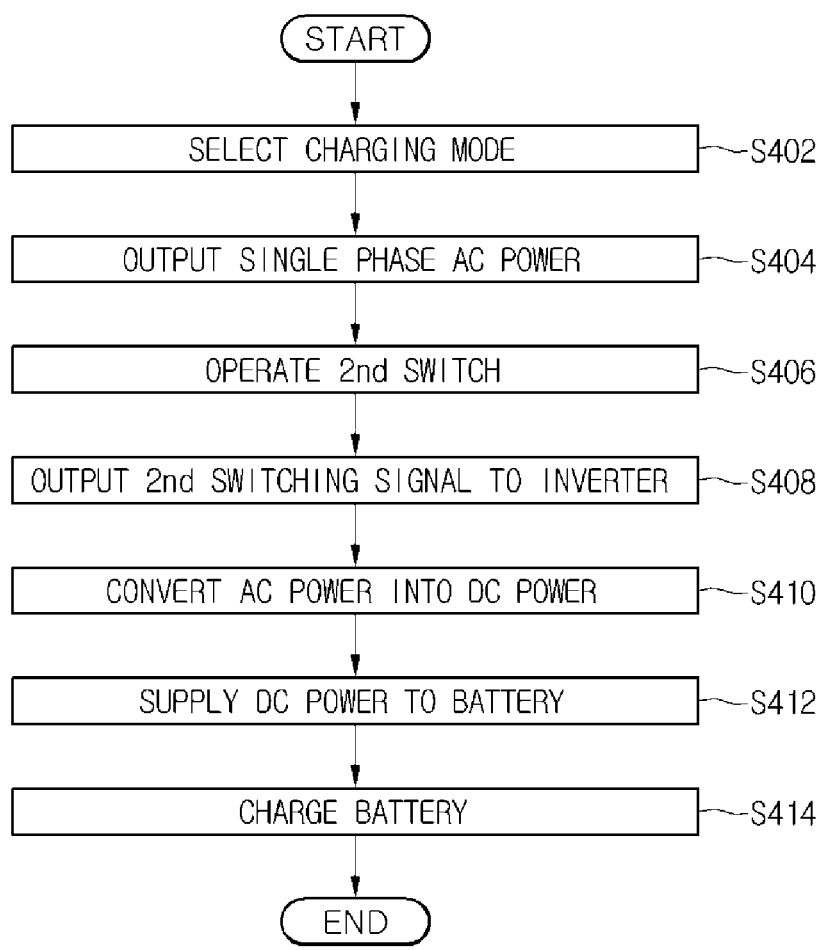

SWITCHING DEVICE FOR ELECTRIC VEHICLE AND METHOD OF CONTROLLING THE SWITCHING DEVICE

CROSS-REFERENCE TO RELATED APPLICATIONS

Pursuant to 35 U.S.C. §119(a), this application claims the benefit of earlier filing date and right of priority to Korean Patent Application No. 10-2011-0061402, filed on Jun. 23, 2011, the contents of which is incorporated by reference herein in its entirety.

BACKGROUND

Embodiments relate to an electric vehicle, and more particularly, to a switching device for an electric vehicle and a method of controlling the switching device.

Alternative energy vehicles include electric vehicles (EVs), hybrid electric vehicles (HEVs) using both fossil fuel and electrical energy, and fuel cell electric vehicles (FCEVs).

Electric vehicles receive power from a battery, and include a motor control device such as an inverter to control a motor, thereby achieving optimal efficiency. Furthermore, since a motor of electric vehicles replaces an engine, electric vehicles are truly eco-friendly vehicles without the emission of poisonous gas.

FIG. 1 is a circuit diagram illustrating a driving system for a typical electric vehicle as described above.

Referring to FIG. 1, an electric vehicle 100 includes a battery 110, an inverter 120, a motor 130, and a controller 140.

The electric vehicle 100 is driven by direct-current (DC) power supplied from the battery 110. The inverter 120 converts the DC power into three-phase alternating current (AC) power for driving the motor 130.

The controller 140 controls the inverter 120 by using a pulse width modulation (PWM) control method for converting DC power into AC power. A gate signal generated from the controller 140 includes a PWM switching signal for controlling the inverter 120.

However, there is a limit for power stored in the battery 110 to drive the motor 130. When the battery 110 is discharged to under a certain power level, the battery 110 cannot drive the motor 130.

Thus, the electric vehicle 100 requires a high voltage charger to charge the battery 110 with high power. Such high voltage chargers may be classified into low speed chargers using single phase power for home use; and high speed chargers using three-phase power for transmitting/supplying electricity.

However, in the related art, an inverter, a high voltage charger, and a low voltage charger are individually manufactured and installed. Thus, overlapping parts inefficiently increase the cost, volume and weight of a vehicle. That is, an inverter uses a power semiconductor switch for driving a motor, and a charger uses a power semiconductor switch for charging.

To address this issue, an inverter and a charger are integrated, and thus, semiconductor switches used therein are also integrated, thereby decreasing the number of inductors that would be otherwise used in the semiconductor switches.

However, when power semiconductor switches having different functions are integrated into a single power semiconductor switch, the single power semiconductor switch should process a plurality of signals. In addition, a plurality of signals may overlap one another or collide with one another during a series of processes.

SUMMARY

Embodiments provide a switching device for an electric vehicle and a method of controlling the switching device, which includes an integrated device having integrated functions.

Embodiments also provide a switching device for an electric vehicle and a method of controlling the switching device, which includes an integrated device having integrated functions to prevent a malfunction due to a switching operation.

In one embodiment, a switching device includes: a switch generating a first or second switching signal according to an operation mode; a signal selection part receiving the first or second switching signal, and selecting the first or second switching signal according to the operation mode to output the selected switching signal; an inverter performing a direct current/alternating current conversion process on power according to the switching signal output from the signal selection part, and outputting the power; and a controller determining the operation mode, and generating a control signal according to the operation mode such that the signal selection part selects the first or second switching signal.

The first or second switching signal may include a pulse width modulation (PWM) signal.

The controller in a driving mode may control the inverter to be operated according to the first switching signal.

The inverter in the driving mode may convert direct current power into three-phase alternating current power according to the first switching signal such that the three-phase alternating current power drives a three-phase motor.

The switching device may further include: a battery; and the three-phase motor, wherein the inverter converts direct current power output from the battery, into the three-phase alternating current power.

The controller in a charging mode may control the inverter to be operated according to the second switching signal.

The switching device may further include a single phase rectifier that converts single phase alternating current power into direct current power, wherein the inverter in the charging mode converts single phase alternating current power into direct current power according to the second switching signal, and outputs the direct current power to a battery.

In another embodiment, a method of controlling a switching device for an electric vehicle includes: selecting an operation mode of the electric vehicle; inputting a first or second switching signal according to the operation mode; outputting the input switching signal to an inverter; and operating the inverter in a driving mode or a charging mode of the electric vehicle according to the output switching signal.

The first or second switching signal may include a pulse width modulation (PWM) signal.

The method may further include: operating the inverter by the first switching signal when the operation mode is the driving mode; converting, by the inverter, direct current power input from a battery, into alternating current power; outputting the alternating current power to a motor; and driving the motor with the alternating current power.

The method may further include: operating the inverter by the second switching signal when the operation mode is the charging mode; converting, by the inverter, alternating current power into direct current power; outputting the direct current power to a battery; and charging the battery with the direct current power.

In another embodiment, a switching device for an electric vehicle includes: a signal selection part selecting a first or second switching signal according to a selected operation mode; a charger receiving single phase alternating current power from an outside thereof, and rectifying the received single phase alternating current power to direct current power to output the direct current power to an inverter; the inverter supplying a battery with the direct current power output from the charger through a switching operation according to the switching signal selected by the signal selection part; and the battery charged with the direct current power supplied through the switching operation of the inverter.

The charger may include: a single phase power source; and a single phase rectifier rectifying single phase alternating current power input from the single phase power source, to direct current power.

The details of one or more embodiments are set forth in the accompanying drawings and the description below. Other features will be apparent from the description and drawings, and from the claims.

BRIEF DESCRIPTION OF THE DRAWINGS

FIG. 3 is a flowchart illustrating a driving method in a driving mode of an electric vehicle according to another embodiment.

FIG. 4 is a flowchart illustrating a driving method in a charging mode of an electric vehicle according to another embodiment.

DETAILED DESCRIPTION OF THE EMBODIMENTS

Terms used in the following description and scopes of claims are not limited to terms that have been in dictionaries, and are used only for explaining specific exemplary embodiments while not limiting the present invention.

Thus, it is intended that the present disclosure covers the modifications and variations of this invention provided they come within the scope of the claims and their equivalents.

Figure 1:
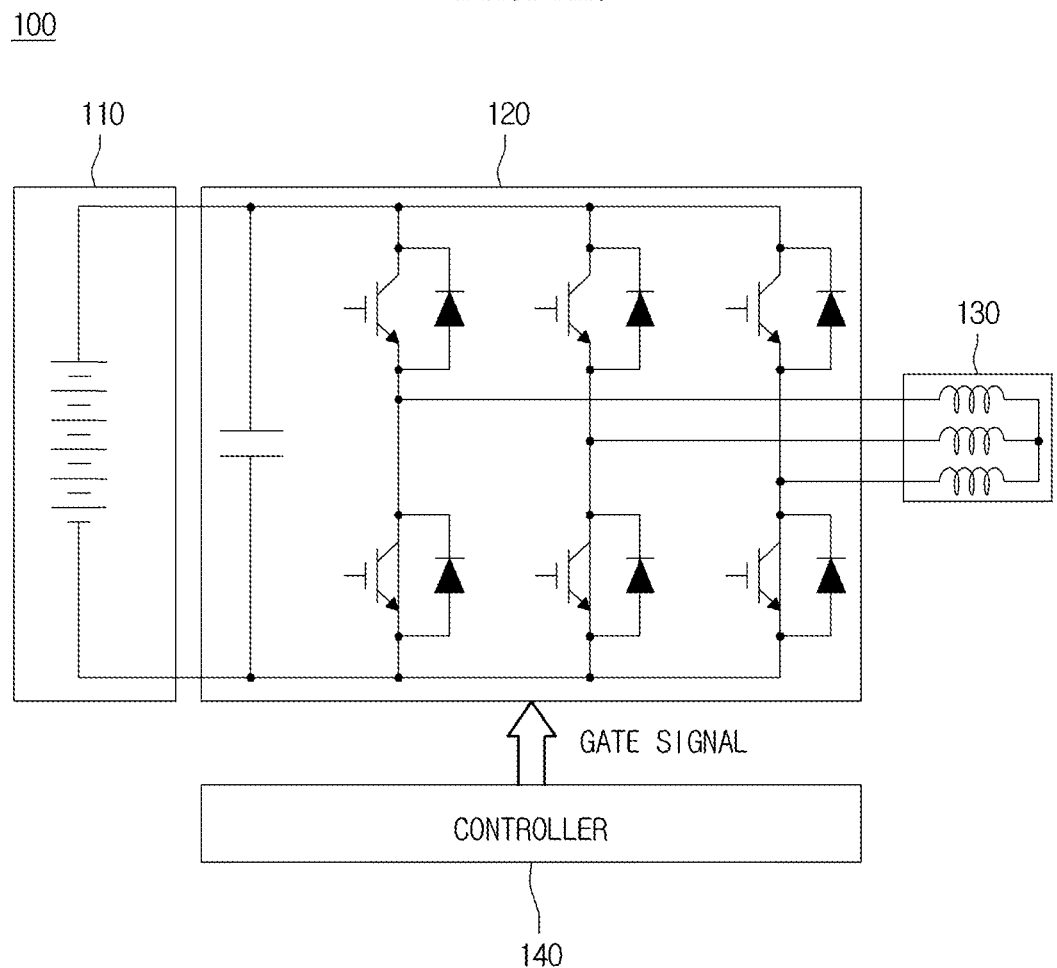
FIG. 1 is a circuit diagram illustrating a driving system for an electric vehicle in the related art.
Figure 2:
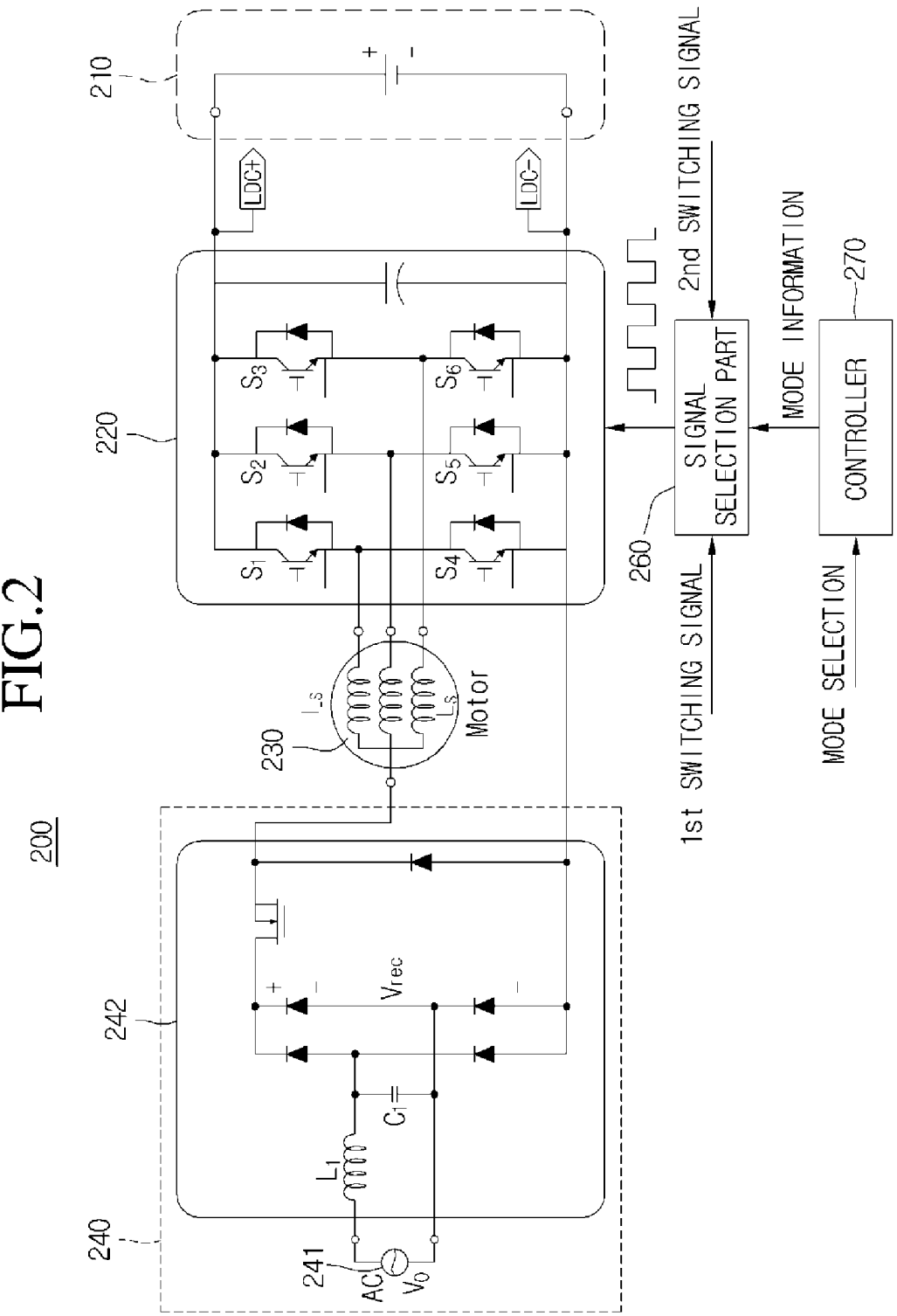
FIG. 2 is a circuit diagram illustrating a driving system for an electric vehicle according to an embodiment.

FIG. 2 is a circuit diagram illustrating a driving system for an electric vehicle according to an embodiment.

Referring to FIG. 2, a driving system 200 for an electric vehicle according to the current embodiment includes a battery 210, an inverter 220, a three-phase motor 230, a charger 240, a single phase power source 241, a single phase rectifier 242, a signal selection part 260, and a controller 270.

For example, the battery 210 may be a fuel cell that generates electrical energy through a chemical reaction of hydrogen ($H_2$) and oxygen ($O_2$) in air, and stores the electrical energy in a stack. The battery 210 may provide direct current (DC) power, or be charged with DC power supplied through terminals of the battery 210.

The inverter 220 converts, based on a switching signal, DC power supplied from the battery 210 into three-phase alternating current (AC) power, and supplies the three-phase AC power to the three-phase motor 230.

Then, the three-phase motor 230 is driven by the three-phase AC power supplied from the inverter 220.

That is, the battery 210 supplies DC power. Thus, the inverter 220 may convert DC power supplied from the battery 210 into three-phase AC power in order to drive the three-phase motor 230.

The switching signal may be a gate signal. The gate signal includes a pulse width modulation (PWM) signal.

That is, DC power from the battery 210 is converted into three-phase AC power by the inverter 220, and the three-phase AC power drives the three-phase motor 230 so as to drive the electric vehicle.

The inverter 220 is controlled using a PWM control method with the switching signal generated by the controller 270 and selected by the signal selection part 260, for example, with the PWM signal. That is, the switching signal output from the signal selection part 260 controls the voltage and frequency of three-phase AC power supplied from the battery 210 to the three-phase motor 230.

The charger 240 charges the battery 210.

The charger 240 includes the single phase power source 241 and the single phase rectifier 242. The single phase power source 241 provides single phase AC power. The single phase rectifier 242 rectifies single phase AC power, provided from the single phase power source 241, to DC power.

The DC power formed by the single phase rectifier 242 is supplied to the inverter 220 through three-phase coils of the three-phase motor 230.

The DC power transmitted through the three-phase coils of the three-phase motor 230 is supplied to the battery 210 through a switching operation of the inverter 220 according to a switching signal. Then, the battery 210 is charged with the DC power supplied through the switching operation.

According to a switching signal, the inverter 220 may convert DC power supplied from the battery 210, into three-phase AC power. Then, the three-phase AC power may be supplied to the three-phase motor 230. The inverter 220 may supply power, transmitted through the single phase rectifier 242, to the battery 210 through a switching operation.

The operation that the inverter 220 transmits power from the battery 210 to the three-phase motor 230 in order to drive the three-phase motor 230 may be performed in a driving mode (a first mode) of the electric vehicle.

The operation that the inverter 220 transmits power through the single phase rectifier 242 to the battery 210 in order to charge the battery 210 may be performed in a charging mode (a second mode) of the electric vehicle.

As described above, the inverter 220 operates in a plurality of modes, and thus, DC/AC conversion is carried out according to a switching signal input thereto.

Switching signals input to the inverter 220 may include a first switching signal for controlling an operation of the inverter 220 in the driving mode. Also, the switching signals input to the inverter 220 may include a second switching signal for controlling an operation of the inverter 220 in the charging mode.

When the first and second switching signals are simultaneously input to the inverter 220, the first and second switching signals may collide or interfere with each other.

To address this issue, only one of the switching signals may be input to the inverter 220.

To this end, the signal selection part 260 may be provided.

That is, the first and second switching signals are input to the inverter 220 via the signal selection part 260, without being directly input to the inverter 220.

The signal selection part 260 receives the first and second switching signals. Then, the signal selection part 260 performs a multiplexing process on the first and second switching signals, and outputs one of the first and second switching signals to the inverter 220.

The above operation of the inverter 220 is entirely controlled by the controller 270. Particularly, the controller 270 may generate and output the first switching signal for controlling the operation of the inverter 220 in the driving mode.

The controller 270 may receive a mode selection signal for selecting operation modes of the electric vehicle. The operation modes may include the driving mode and the charging mode.

When the controller 270 receives the mode selection signal, the controller 270 may output a signal according to the mode selection signal to correspond to a signal to be selected by the signal selection part 260. When the mode selection signal corresponds to the driving mode, the controller 270 may control the signal selection part 260 to select the first switching signal. When the mode selection signal corresponds to the charging mode, the controller 270 may control the signal selection part 260 to select the second switching signal.

Thus, the signal selection part 260 may select one of switching signals input thereto according to a control signal from the controller 270, and output the switching signal.

The first and second switching signals may be input to the signal selection part 260 through different paths. Thus, the signal selection part 260 may discriminate between switching signals input thereto.

When the driving mode is selected, the inverter 220 is operated according to the first switching signal. Accordingly, driving power is supplied to the three-phase motor 230 to drive the three-phase motor 230.

When the charging mode is selected, the inverter 220 is operated according to the second switching signal. Accordingly, charging power is supplied to the battery 210 to charge the battery 210.

First and second switches (not shown) may generate the first and second switching signals, respectively, and supply the first and second switching signals to the signal selection part 260.

FIG. 3 is a flowchart illustrating a switching method of a switch in a driving mode of an electric vehicle according to another embodiment.

Referring to FIG. 3, operation modes of the electric vehicle 100 may be selected through the controller 270 from the outside of the electric vehicle 100. That is, a mode selection signal determining a current operation state of the electric vehicle 100 may be input to the controller 270 by a user. Then, the electric vehicle 100 is operated in a mode according to the input mode selection signal. In the current embodiment, the driving mode is exemplified as a selected operation mode of the electric vehicle 100.

When the controller 270 receives a mode section signal corresponding to the driving mode as an operation mode of the electric vehicle 100 in operation S302, the battery 210 outputs DC power in operation S304.

In operation S306, the controller 270 controls the signal selection part 260 to output the first switching signal generated by the first switch, to the inverter 220.

In operation S308, according to the first switching signal output from the signal selection part 260, the inverter 220 converts the DC power input from the battery 210, into three-phase AC power.

In operation S310, the controller 270 controls the three-phase AC power formed by the inverter 220 to be supplied to the three-phase motor 230.

The controller 270 performs the driving mode in which the three-phase AC power supplied to the three-phase motor 230 drives the three-phase motor 230.

FIG. 4 is a flowchart illustrating a driving method in a charging mode of an electric vehicle according to another embodiment.

Referring to FIG. 4, operation modes of the electric vehicle 100 may be selected through the controller 270 from the outside of the electric vehicle 100. That is, a mode selection signal determining a current operation state of the electric vehicle 100 may be input to the controller 270 by a user. Then, the electric vehicle 100 is operated in a mode according to the input mode selection signal. In the current embodiment, the charging mode is exemplified as a selected operation mode of the electric vehicle 100.

When the controller 270 receives a mode section signal corresponding to the charging mode as an operation mode of the electric vehicle 100 in operation S402, single phase AC power is output from the single phase power source 241 in operation S404.

In operation S406, the controller 270 controls the signal selection part 220 to select the second switching signal generated by the second switch.

In operation S410, according to the second switching signal output from the signal selection part 260, the inverter 220 converts the single phase AC power into DC power.

The inverter 220 supplies the DC power to the battery 210 in operation S412, and charges the battery 210 with the DC power in operation S414.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A switching device comprising:
    a controller determining an operation mode and generating a control signal according to the determined operation mode, wherein the operation mode is a driving mode or a charging mode;
    a switch generating a first switching signal in a driving mode and a second switching signal in a charging mode according to the determined operation mode;
    a signal selection part receiving the first switching signal and the second switching signal and selecting the first switching signal or the second switching signal according to the control signal in order to output the selected switching signal;
    an inverter performing a direct current/alternating current conversion process on power according to the selected switching signal, performing the driving mode when the first switching signal is selected and performing the charging mode when the second switching signal is selected.

2. The switching device according to claim 1, wherein the first switching signal and the second switching signal each comprise a pulse width modulation (PWM) signal.

3. The switching device according to claim 1, wherein the controller further controls the inverter to operate according to the first switching signal in the driving mode.

4. The switching device according to claim 3, wherein the inverter further converts direct current power output from a battery into three-phase alternating current power in the driving mode according to the first switching signal such that the three-phase alternating current power drives a three-phase motor.

5. The switching device according to claim 4, further comprising
the battery,
wherein the inverter further converts direct current power output from the battery into the three-phase alternating current power.

6. The switching device according to claim 1, wherein the controller further controls the inverter to operate according to the second switching signal in the charging mode.

7. The switching device according to claim 6, further comprising a single phase rectifier,
wherein the inverter further converts single phase alternating current power into direct current power in the charging mode according to the second switching signal and charges a battery with the direct current power.

8. A method of controlling a switching device for an electric vehicle, the method comprising:
selecting an operation mode of the electric vehicle, the operation mode a driving mode or a charging mode;
generating a first switching signal in the driving mode and a second switching signal in the charging mode;
outputting the first or second switching signal to an inverter; and
operating the inverter in the driving mode or the charging mode according to the output first or second switching signal.

9. The method according to claim 8, wherein the first switching signal and the second switching signal each comprise a pulse width modulation (PWM) signal.

10. The method according to claim 8, further comprising:
operating the inverter according to the first switching signal in the driving mode;
converting direct current power input from a battery into three-phase alternating current power;
and
driving a three-phase motor with the three-phase alternating current power.

11. The method according to claim 8, further comprising:
operating the inverter according to the second switching signal in the charging mode;
converting single-phase alternating current power into direct current power according to the second switching signal;
and
charging a battery with the direct current power.

\* \* \* \* \*